United States Patent
Nozaki et al.

(10) Patent No.: US 9,446,796 B2
(45) Date of Patent: Sep. 20, 2016

(54) UTILITY VEHICLE

(71) Applicant: KAWASAKI JUKOGYO KABUSHIKI KAISHA, Hyogo (JP)

(72) Inventors: Takuma Nozaki, Aioi (JP); Yuji Ohshita, Osaka (JP); Shinichi Tanaka, Kakogawa (JP); Jun Takagi, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,792

(22) Filed: Dec. 30, 2014

(65) Prior Publication Data

US 2016/0185393 A1    Jun. 30, 2016

(51) Int. Cl.
| | |
|---|---|
| *B60K 13/02* | (2006.01) |
| *B60K 15/00* | (2006.01) |
| *B62D 25/08* | (2006.01) |
| *F02M 35/04* | (2006.01) |
| *F02M 37/00* | (2006.01) |
| *F02M 35/16* | (2006.01) |
| *B60K 5/00* | (2006.01) |

(52) U.S. Cl.
CPC ............ *B62D 25/082* (2013.01); *B60K 5/00* (2013.01); *B60K 13/02* (2013.01); *B60K 15/00* (2013.01); *F02M 35/048* (2013.01); *F02M 35/161* (2013.01); *F02M 35/162* (2013.01); *F02M 37/007* (2013.01)

(58) Field of Classification Search
CPC .... B62D 25/082; B62D 25/085; B60K 5/00; B60K 5/12; B60K 13/00; B60K 13/02; B60K 15/00; B60K 15/063; B60K 15/067; F02M 35/04; F02M 35/048; F02M 35/161; F02M 35/162; F02M 37/007
USPC ................. 180/291, 292, 296, 68.3, 69.4
See application file for complete search history.

(56) References Cited

U.S. PATENT DOCUMENTS

| | | | | |
|---|---|---|---|---|
| 1,556,738 | A * | 10/1925 | Wood | F02M 35/04 15/DIG. 8 |
| 8,499,870 | B2 * | 8/2013 | Nakamura | B62D 21/186 180/68.3 |
| 8,960,347 | B2 * | 2/2015 | Bennett | B60K 13/02 180/68.3 |

FOREIGN PATENT DOCUMENTS

JP    6-34220    9/1994

* cited by examiner

*Primary Examiner* — John Walters
(74) *Attorney, Agent, or Firm* — Wenderoth, Lind & Ponack, L.L.P.

(57) ABSTRACT

A utility vehicle including: a chassis; an engine provided on the chassis; an engine room accommodating the engine; a storage box provided next to the engine room and accommodating an air cleaner or a battery; a partition member dividing the engine room and the storage box; and a rivet configured to detachably attach at least part of the partition member to the chassis.

4 Claims, 13 Drawing Sheets

UTILITY VEHICLE

BACKGROUND OF THE INVENTION

1. Field of the Invention

The present invention relates to a utility vehicle, and relates particularly to a structure for partitioning an engine room and a storage box.

2. Description of the Related Art

In a utility vehicle including a partition dividing an engine room and a storage box, the partition conventionally prevents dust or the like of an engine in the engine room from entering the storage box to keep the interior of the storage box clean. This storage box accommodates engine equipment such as an air cleaner to prevent dust or the like from entering the engine equipment.

Though not a utility vehicle, a bus according to the prior art disclosed in JP 06-34220 Y includes a side plate having a box shape partitioning a luggage room and an engine room provided in a box.

A partitioning structure between an engine room and a storage box in a conventional utility vehicle includes a partition fixed to a chassis so as to be easily undetachable from the chassis. This configuration makes it difficult to access the interior of the engine room from the interior of the storage box. It is thus hard to check or maintain an engine accessory such as an oil filter and an oil cooler in the engine room.

SUMMARY OF THE INVENTION

The present invention has been made in view of the problems mentioned above, and an object thereof is to provide a utility vehicle configured to allow the interior of an engine room to be easily accessible from the interior of a storage box, so as to enable check or maintenance of an engine accessory such as an oil filter or an oil cooler in the engine room.

In order to achieve the object mentioned above, the present invention provides a utility vehicle including: a chassis; an engine provided on the chassis; an engine room accommodating the engine; a storage box provided next to the engine room and accommodating equipment of the engine; a partition member dividing the engine room and the storage box; and an attachment portion configured to detachably attach at least part of the partition member to the chassis.

The at least part of the partition member is detachably attached to the chassis by the attachment portion in the present invention. When the at least part of the partition member is detached from the chassis, the interior of the engine room is easily accessible from the interior of the storage box. This configuration enables easy check or maintenance of the engine accessory such as the oil filter or the oil cooler in the engine room by way of the storage box.

When the attachment portion is located at an arbitrary position, arbitrary part of the partition member can be detached from the chassis.

The present invention can preferably adopt any of the following configurations in addition to the configuration described above.

(a) The equipment includes an intake port of an air intake duct of an air cleaner.

In the configuration (a), the storage box accommodates the equipment including the intake port of the air intake duct of the air cleaner. The partition member prevents entry of dust or the like of the engine in the engine room to keep the interior of the storage box clean. This configuration thus reliably prevents entry of dust or the like through the intake port of the air intake duct of the air cleaner.

(b) The engine has an engine accessory that requires check or maintenance, and the attachment portion is located at a position corresponding to the engine accessory.

In the configuration (b), the attachment portion is located at the position corresponding to the engine accessory. The detached part of the partition member from the chassis can be thus minimized upon check or maintenance of the engine accessory. This configuration enables efficient check or maintenance of the engine accessory in the engine room by way of the storage box.

(c) The partition member is made of elastic member.

The partition member is made of elastic member in the configuration (c). When the partition member is detached from the chassis and is turned over only in a necessary range, the interior of the engine room is easily accessible.

(d) The utility vehicle further includes a bracket attached to the chassis, and the partition member and a fuel pipe of the engine are attached to the bracket.

The partition member and the fuel pipe of the engine are attached to the bracket in the configuration (d). This configuration simplifies the structure for attaching the fuel pipe as compared to a case of providing a bracket for attachment of the partition member and a different bracket for attachment of the fuel pipe.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 14 each show a utility vehicle according to the present invention. A preferred embodiment of the present invention will now be described with reference to these figures. For convenience of explanation, an advancing direction of the utility vehicle is explained as the "front" of the utility vehicle and the respective components thereof, and the left-right direction as viewed from the driver or the passenger of the vehicle is explained as the "left-right direction" of the vehicle and the respective components thereof.

Figure 1:
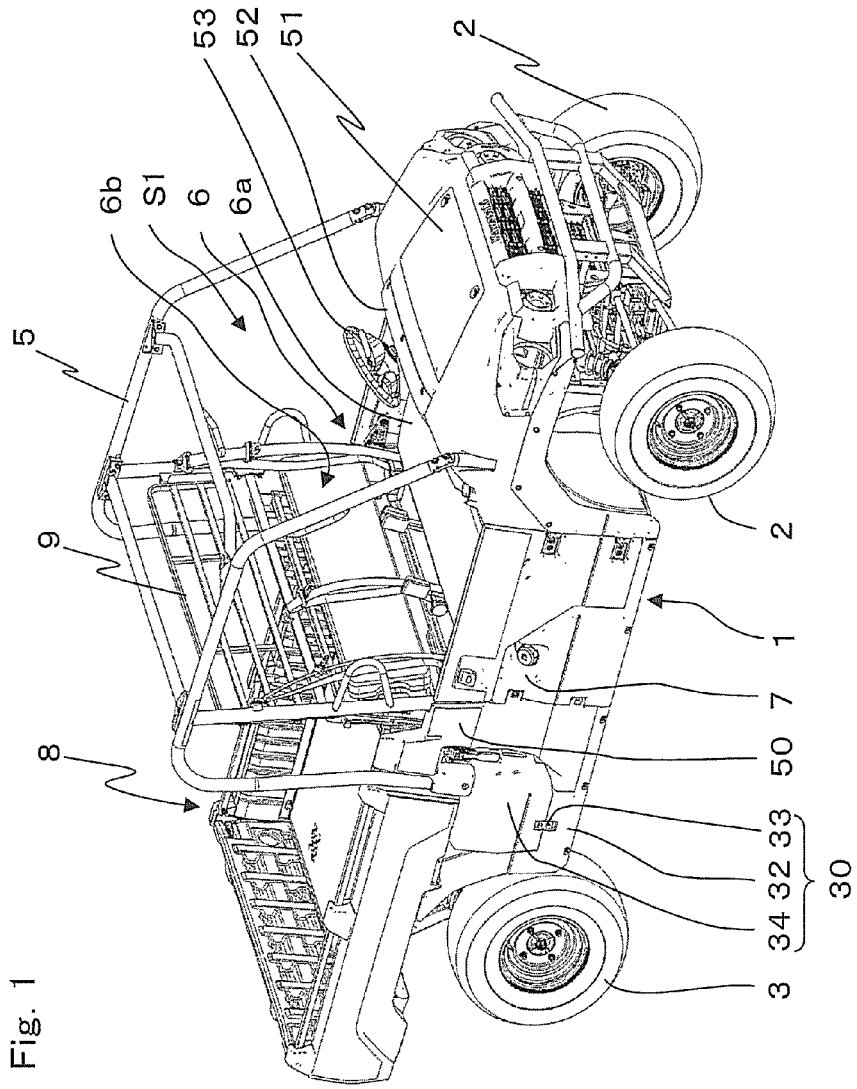
FIG. 1 is a perspective view viewed from diagonally right and ahead, of a utility vehicle according to the present invention.

FIG. 1 is a perspective view showing the utility vehicle according to the present invention, viewed from the diagonally right front. The utility vehicle is used mainly for running in off-road circumstances like a grass field, a gravel field, and a sand field as well as an unpaved mountain path, an unpaved path through woods, a mud path, and a rocky field.

As shown in FIG. 1, the utility vehicle includes a chassis 1 that has a front portion provided with a pair of right and left front wheels 2 and a rear portion provided with a pair of right and left rear wheels 3. The chassis 1 is provided, on the lateral ends, with side covers 50 covering lateral portions of the chassis 1. A boarding space S1 is provided between the front wheels 2 and the rear wheels 3 and is surrounded with a R. O. P. S. 5. The R. O. P. S. is an abbreviation for a rollover protective structure. The boarding space S1 accommodates a bench type seat 6. The seat 6 has a one-row seat configuration. A fuel tank 7 is provided below the seat 6. A cargo bed 8 is provided behind the seat 6. A screen 9 is provided between the boarding space S1 and the cargo bed 8. A bonnet 51 boarding space is provided in front of the boarding space S1. The bonnet 51 is provided, at the upper rear end, with a dashboard 52. The dashboard 52 is provided with a steering wheel 53 and a shift lever (not shown) in an operable range for a driver seated in a driver's region 6a of the seat 6.

The cargo bed 8 extends backward beyond the rear wheels 3, and substantially horizontally from the vicinity of a backrest 6b of the seat 6. A storage box 30 is provided on the right and below the cargo bed 8 as well as ahead of the rear wheels 3.

The storage box 30 includes a lid 34, a side surface cover 32, an attachment part 33, as well as a rear surface cover and a bottom plate (not shown). The lid 34 is detachably attached to the side surface cover 32 by the attachment part 33.

Figure 2:
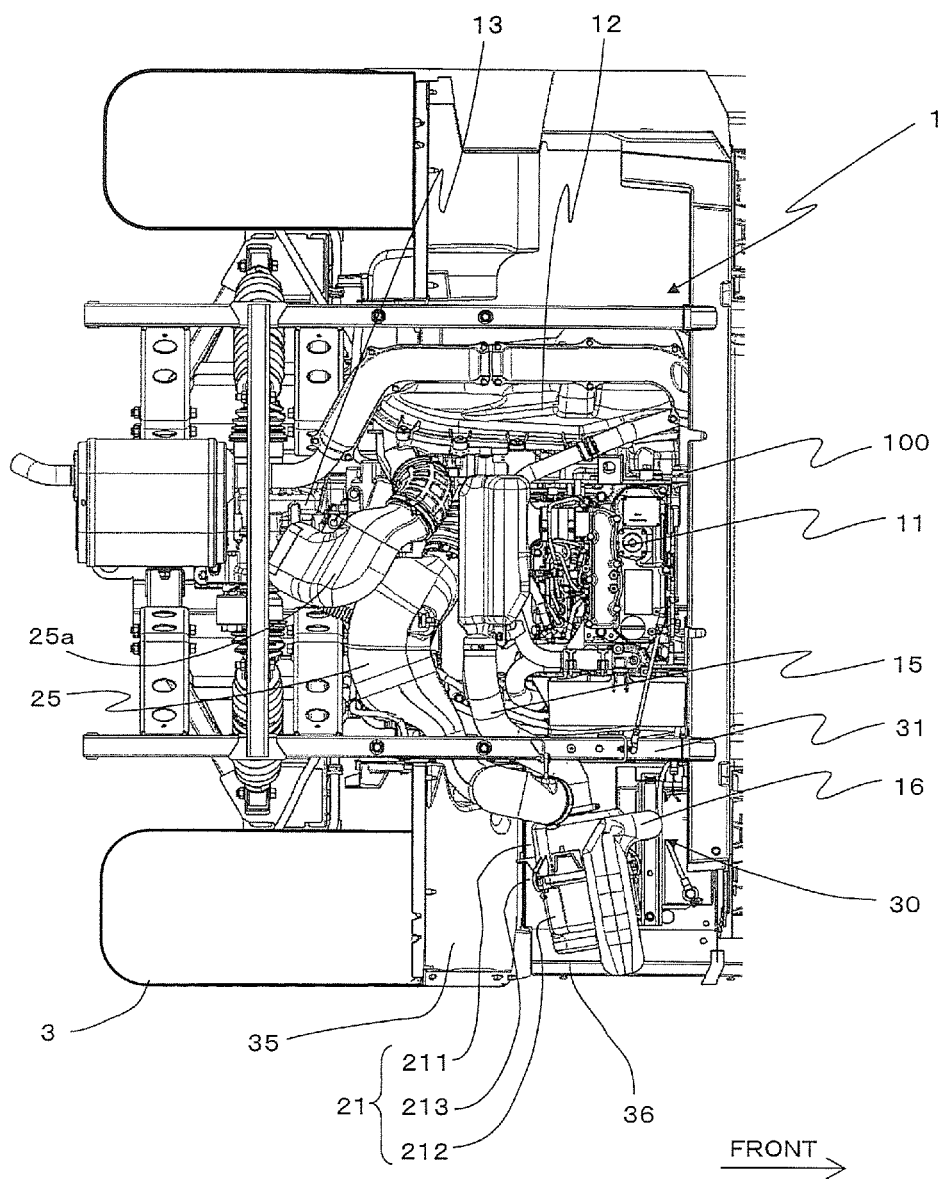
FIG. 2 is a plan view of an engine and engine peripheral structures of the utility vehicle.
Figure 3:
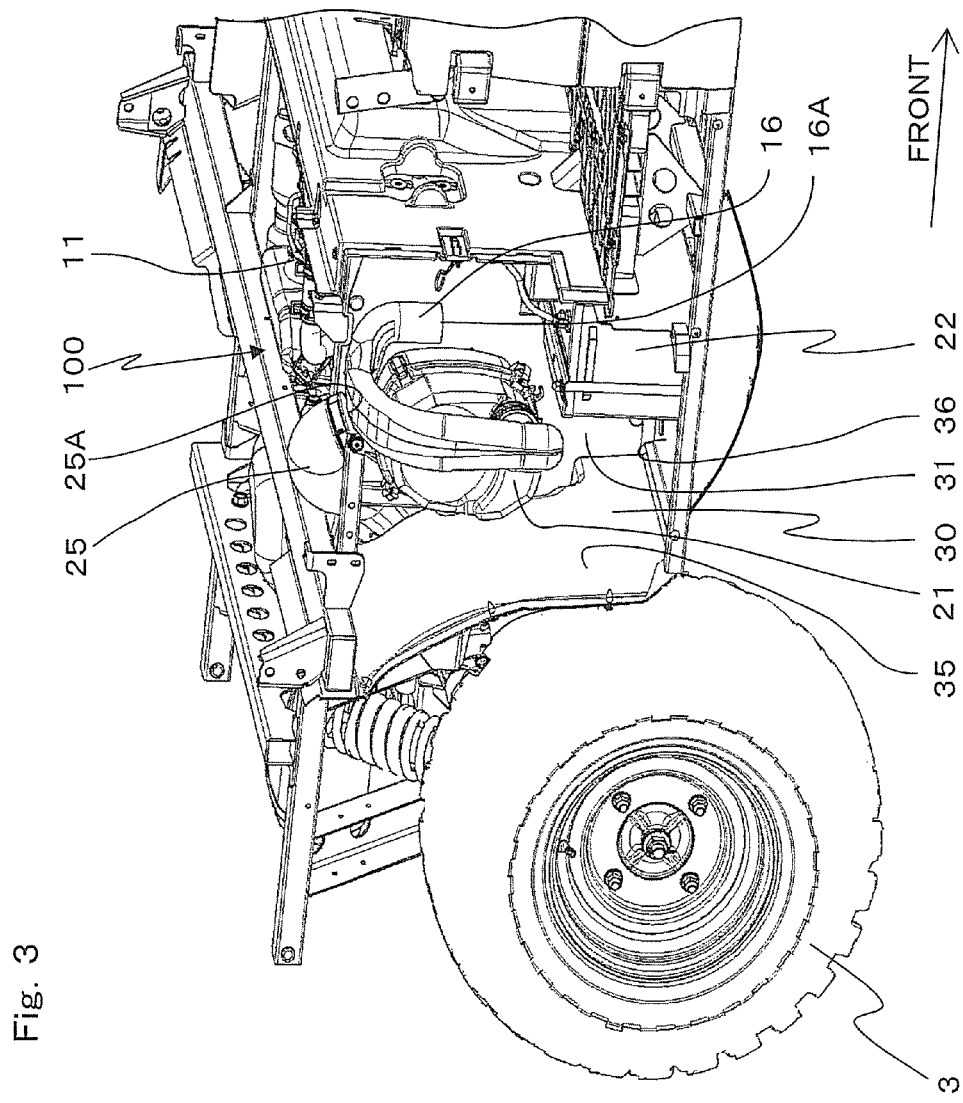
FIG. 3 is a perspective view viewed from diagonally right and ahead, of the engine and an intake system of a V-belt continuously variable transmission in the utility vehicle.

FIG. 2 is a plan view of an engine and engine peripheral structures. FIG. 3 is a perspective view from diagonally right and ahead, of the engine and an intake system of a V-belt continuously variable transmission. FIG. 3 shows a state where the lid 34 and the side surface cover 32 of the storage box 30 are removed.

As shown in FIGS. 2 and 3, an engine room 100 is provided on the left next to the storage box 30. The engine room 100 and the storage box 30 are divided from each other by a partition member 31. The engine room 100 accommodates a travel driving engine 11, a V-belt continuously variable transmission 12, a gear type transmission 13, an air intake duct 15 for combustion air of the engine 11, a cooling duct 25 for coolant air of the V-belt continuously variable transmission 12, an exhaust duct 25a for coolant air, and the like. The engine 11 is attached to the chassis 1. The V-belt continuously variable transmission 12 is connected to the left end of the engine 11. The engine 11 has an output shaft coupled to a rear vehicle shaft (not shown) by way of the V-belt continuously variable transmission 12 and the gear type transmission 13 so as to transmit motive power. The rear wheels 3 are coupled respectively to the ends of the rear vehicle shaft.

The storage box 30 has a storage space surrounded with and airtightly sealed by the lid and the side surface cover (not shown), as well as a rear surface cover 35, a bottom plate 36, and the partition member 31. This storage space accommodates equipment of the engine 11 such as an air cleaner 21, a battery 22, the air intake duct 15 of the engine 11, as well as part of an air import duct 16 of the air cleaner 21 and the cooling duct 25. The rear surface cover 35 is a plate member curved to surround part of the rear wheels 3 along peripheral surfaces and end surfaces of the rear wheels 3. The rear surface cover 35 serves as a fender preventing entry of dust from the rear wheels 3.

The air cleaner 21 has a substantially rectangular parallelepiped shape. The air cleaner 21 is located between the battery 22 and the rear surface cover 35 of the storage box 30. The air cleaner 21 includes a main case 211, an air import case 212, a plurality of clamps 213, and a filter (not shown). The air import case 212 is detachably attached to the main case 211 by the plurality of clamps. The filter is accommodated in the main case 211.

The air intake duct 15 of the engine 11 has one end connected to an intake manifold of the engine 11 and the other end connected to the main case 211 of the air cleaner 21. The air intake duct 15 is part of an intake system of the engine 11.

The air import duct 16 of the air cleaner 21 has one end connected to the center of the right side surface of the air import case 212 of the air cleaner 21. The air import duct 16 has the other end, namely, an air inlet 16A, located in the storage box 30 and opened downward. The air import duct 16 is part of the intake system of the engine 11.

The cooling duct 25 of the V-belt continuously variable transmission 12 has one end connected to the V-belt continuously variable transmission 12. The cooling duct 25 has the other end, namely, an air inlet 25A, located in the storage box 30 and opened downward. The cooling duct 25 is part of the intake system of the V-belt continuously variable transmission 12.

As described above, the storage box 30, in other words, the storage space, collectively accommodates the air inlet 16A of the air import duct 16 of the air cleaner 21 and the air inlet 25A of the cooling duct 25 of the V-belt continuously variable transmission 12. Clean air in the storage space is thus imported to the air cleaner 21 and the V-belt continuously variable transmission 12.

The battery 22 has a substantially rectangular parallelepiped shape. The battery 22 is attached to the bottom plate 36 of the storage box 30.

Figure 4:
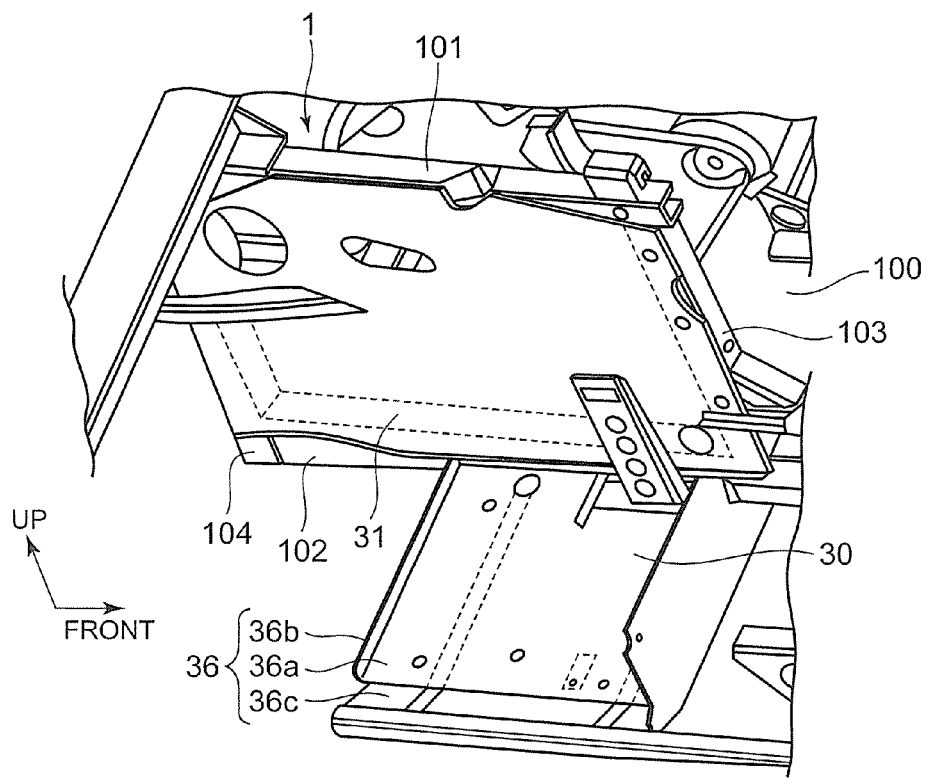
FIG. 4 is a perspective view viewed from diagonally right and above, of a partition member and its peripheral structures in the utility vehicle.

FIG. 4 is a perspective view from diagonally right and above, of the partition member 31 and its peripheral structures. FIG. 4 does not show the lid, the side surface cover, and the rear surface cover of the storage box 30. FIG. 4 does not either show the air cleaner 21, the battery 22, the air intake duct 15 of the engine 11, and the cooling duct 25 of the V-belt continuously variable transmission 12 in the storage box 30.

As shown in FIG. 4, the chassis 1 is provided, between the storage box 30 and the engine room 100, with an upper longitudinal frame 101 and a lower longitudinal frame 102 that extend in parallel with each other in a front-back direction, a front vertical frame 103 and a rear vertical frame 104 that extend vertically in parallel with each other.

The bottom plate 36 of the storage box 30 has a main body 36a extending substantially horizontally, a rising portion 36b rising vertically upward from the rear end of the main body 36a, and a slant portion 36c rising diagonally upward and rightward in the vehicle width direction from the right end in the vehicle width direction of the main body 36a.

Figure 5:
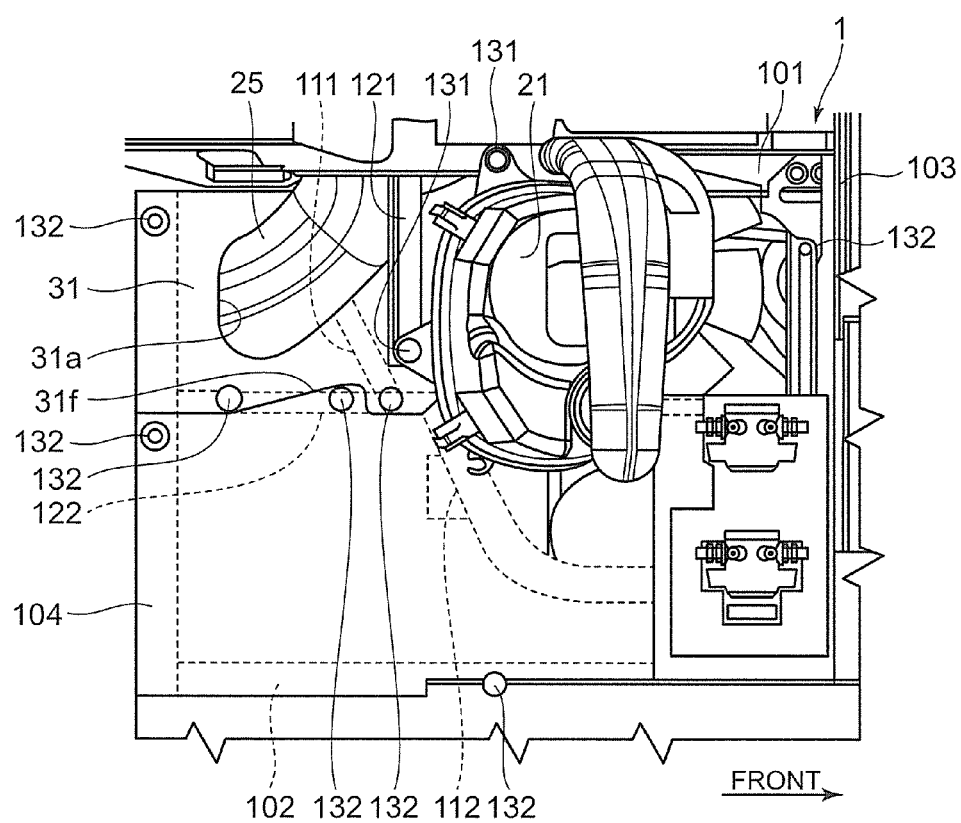
FIG. 5 is a right side view of the interior of a storage box of the utility vehicle.

FIG. 5 is a right side view in the vehicle width direction, of the interior of the storage box 30.

As shown in FIG. 5, attached to the longitudinal frame 101 is a bracket 121 that extends downward from the center in the front-back direction of the longitudinal frame 101. The vertical frames 103 and 104 are attached to a bracket 122. More specifically, the bracket 122 extends in the front-back direction and is attached to the center of the vertical frame 103 and to the center of the vertical frame 104. The bracket 122 is attached to fuel pipes 111 of the engine.

The air cleaner 21 is attached to the longitudinal frame 101 and the bracket 121 by a plurality of rivets 131.

The partition member 31 is attached to the longitudinal frames 101 and 102, the vertical frames 103 and 104, and the bracket 122 by a plurality of rivets 132. Each of the plurality of rivets 132 includes an attachment portion detachable from the longitudinal frames 101 and 102, the vertical frames 103 and 104, and the bracket 122. The rivets 132 are configured as push rivets, for example.

Figure 6:
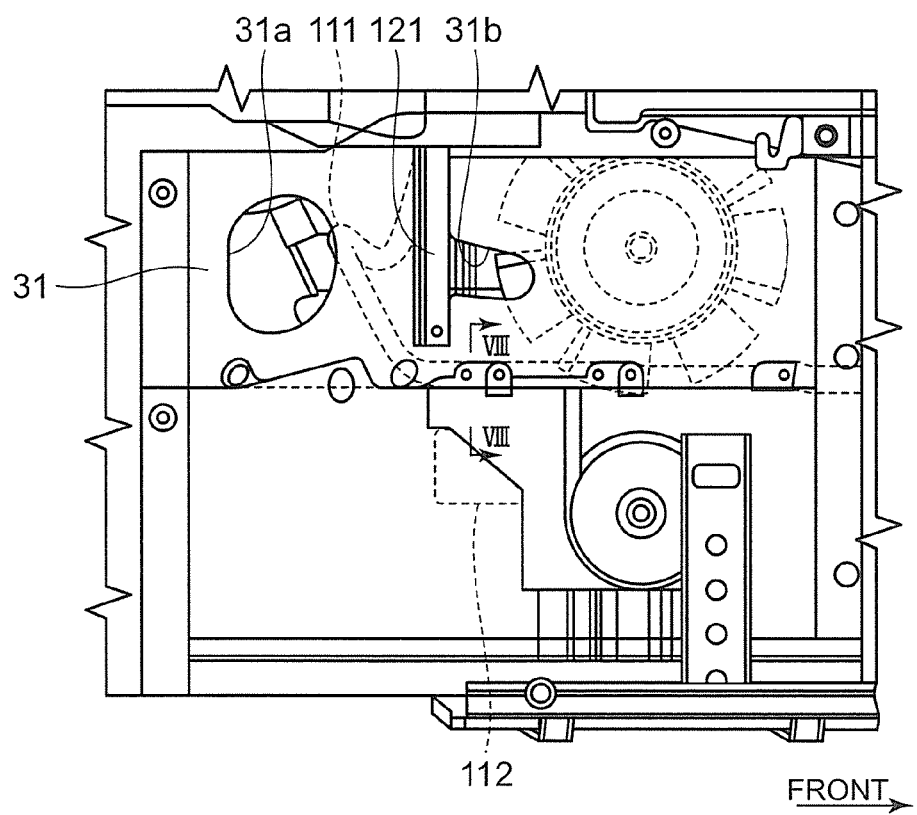
FIG. 6 is a side view of a state where engine equipment in the storage box shown in FIG. 4 is omitted.
Figure 7:
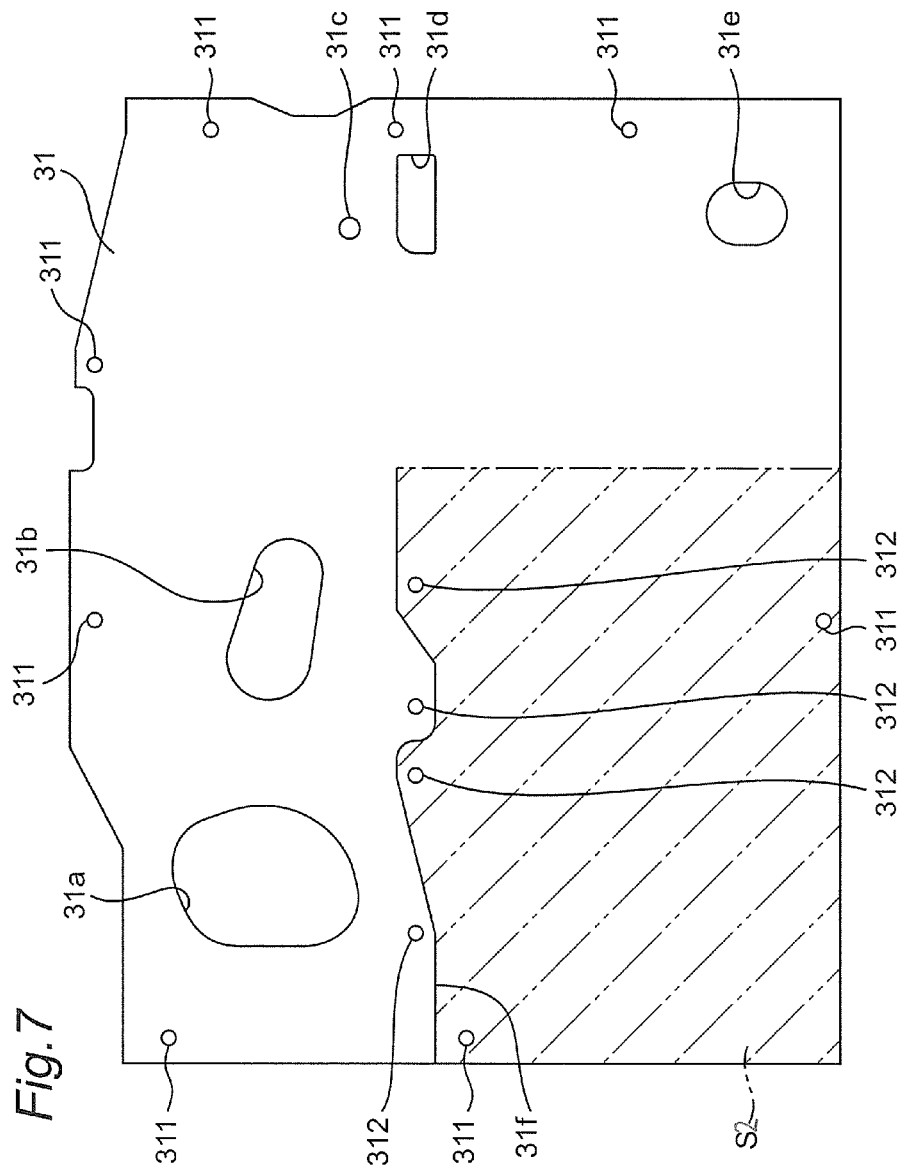
FIG. 7 is a plan view of the partition member.

FIG. 6 is a side view of a state where the air cleaner 21, the battery 22, the air intake duct 15 of the engine 11, and the cooling duct 25 of the V-belt continuously variable transmission 12 in the storage box 30 shown in FIG. 5 are omitted. FIG. 7 is a plan view of the partition member 31.

As shown in FIGS. 6 and 7, the partition member 31 is a substantially rectangular plate. The partition member 31 is made of elastic member such as rubber. The partition member 31 is provided with a plurality of openings or the like. More specifically, the partition member 31 is provided, at the top, with a cooling duct opening 31a allowing the cooling duct 25 of the V-belt continuously variable transmission to pass therethrough, an air intake duct opening 31b allowing the air intake duct 15 of the engine to pass therethrough, an oil level gauge opening 31c allowing an oil level gauge to be inserted thereinto or extracted therefrom, and an ground opening 31d allowing a ground wire of the battery to pass therethrough. The partition member 31 is provided, at the bottom, with a harness opening 31e allowing a harness of the battery to pass therethrough. The partition member 31 is provided, at the vertical center, with a cutout 31f extending in the front-back direction along the bracket 122. The cutout 31f extends substantially horizontally from the rear end side toward the center of the partition member 31. The partition member 31 is provided, at positions corresponding to the plurality of rivets 132 in the vicinity of the peripheral edge, with rivet openings 311 allowing the rivets 132 to pass therethrough. The partition member 31 is provided, at positions corresponding to the plurality of rivets 132 in the vicinity of the cutout 31f, with rivet openings 312 allowing the rivets 132 to pass therethrough. Part of the partition member 31 can be detached from the longitudinal frame 101 or 102, the vertical frame 103 or 104, or the bracket 122 and be turned over by detaching the push rivets. More specifically, when the plurality of rivets corresponding to the plurality of rivet openings 312 is detached and a region S2 below the cutout 31f of the partition member 31 is turned over, an oil filter 112 as an engine accessory can be checked or maintained.

Figure 8:
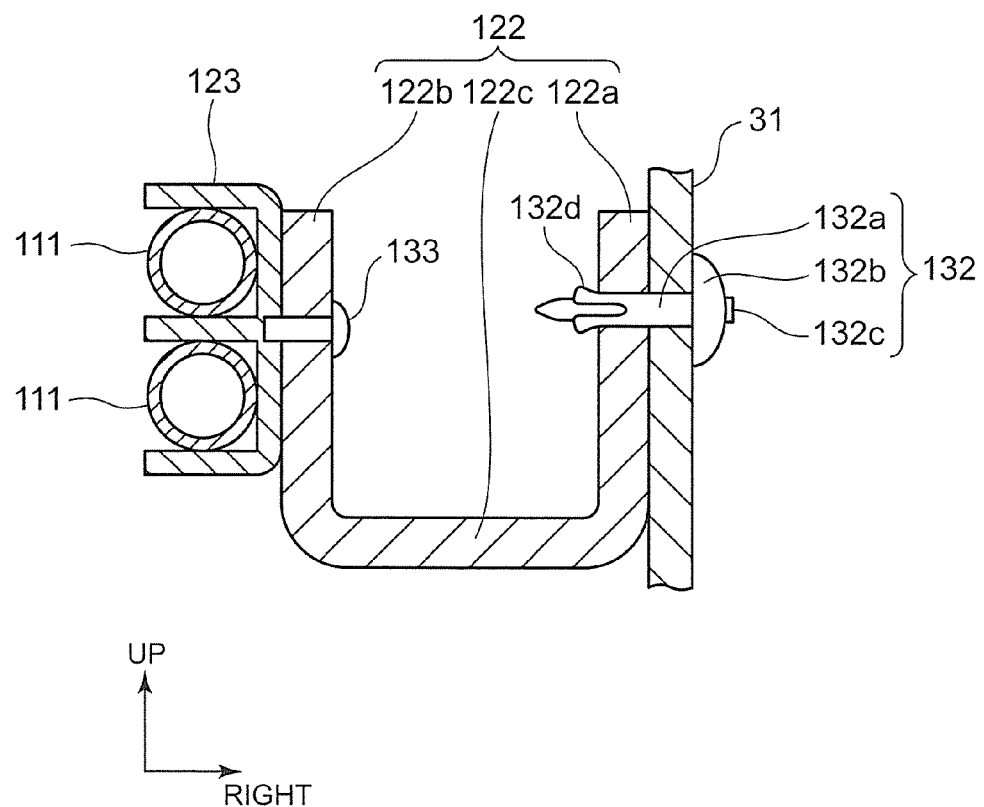
FIG. 8 is a sectional view taken along VIII-VIII indicated in FIG. 6.

FIG. 8 is a sectional view taken along VIII-VIII indicated in FIG. 6.

As shown in FIG. 8, the bracket 122 has a substantially U shape in cross section. The bracket 122 has vertical portions 122a and 122b extending vertically in parallel with each other, and a horizontal portion 122c extending horizontally between the vertical portions 122a and 122b.

The vertical portion 122a has an outer vertical surface (close to the storage box) to which the partition member 31 is attached by the rivet 132. This rivet 132 is configured as the push rivet, and has a rivet body 132a, a rivet head 132b, and a pin 132c slidable along the axis of the rivet 132 in the rivet body 132a and the rivet head 132b. In a state where the rivet body 132a penetrates the partition member 31 and the vertical portion 122a of the bracket 122, the pin 132c is pushed into the rivet body 132a and the rivet head 132b. The rivet body 132a has a distal end 132d being expanded in this state, and the expanded portion and the rivet head 132b fasten the partition member 31 and the bracket 122.

The vertical portion 122b has an outer vertical surface (close to the engine room) to which a bracket 123 is attached by a rivet 133. The bracket 123 has a substantially E shape in cross section, and retains the two fuel pipes 111 of the engine respectively in each recess.

Figure 9:
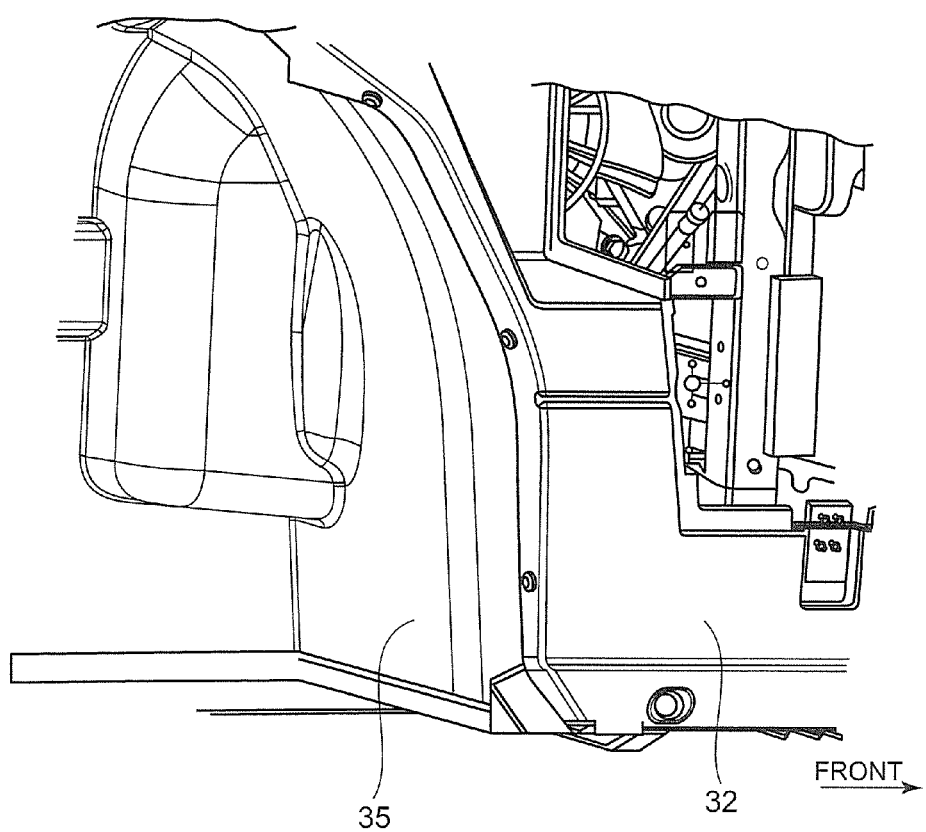
FIG. 9 is a perspective view viewed from diagonally right and behind, of a side surface cover and a rear surface cover of the storage box.
Figure 10:
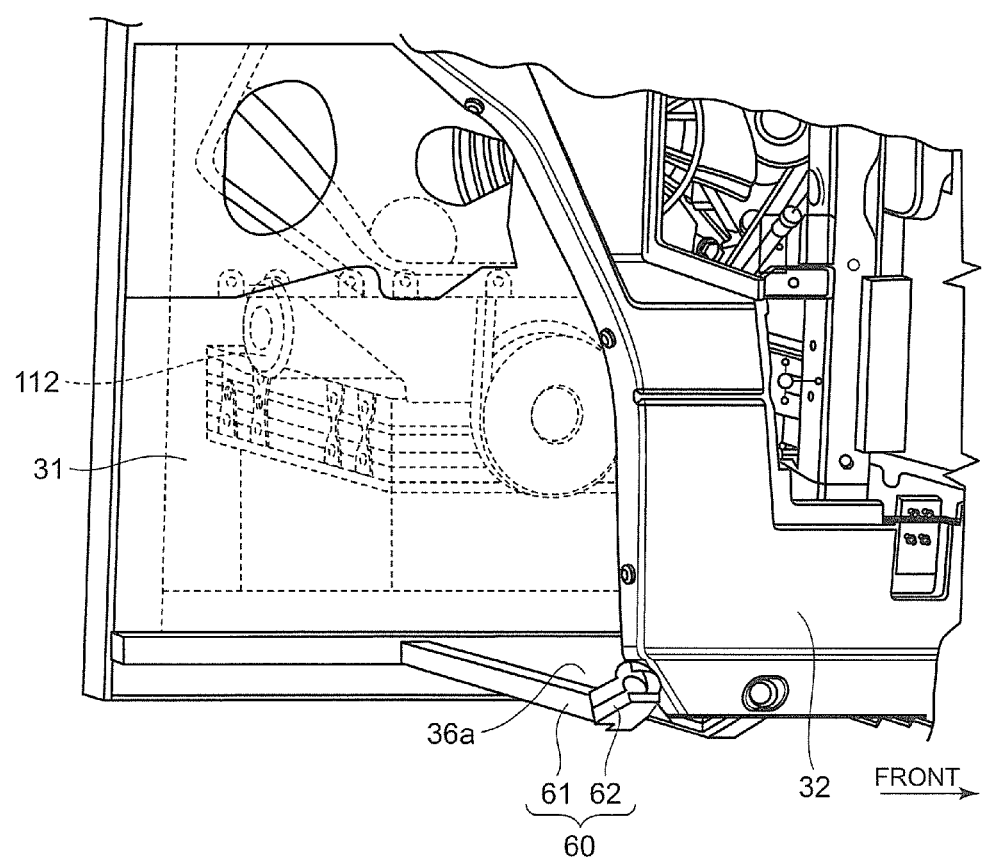
FIG. 10 is a perspective view of a state where the rear surface cover of the storage box shown in FIG. 9 is removed.

FIG. 9 is a perspective view from diagonally right and behind, of the side surface cover 32 and the rear surface cover 35 of the storage box 30. FIG. 10 is a perspective view of a state where the rear surface cover 35 of the storage box 30 shown in FIG. 9 is removed. FIG. 10 does not show the air cleaner 21, the battery 22, the air intake duct 15 of the engine 11, and the cooling duct 25 of the V-belt continuously variable transmission 12 in the storage box 30.

As shown in FIG. 10, the partition member 31 is exposed when the rear surface cover 35 is detached. When at least part of the partition member 31 is detached and turned over, the oil filter 112 of the engine or the like is easily accessible.

A sealing member 60 is attached to the rear end of the main body 36a of the bottom plate. The sealing member 60 has a main body 61 extending in the vehicle width direction and an end 62 that is located on the right in the vehicle width direction of the main body 61 and is bent.

Figure 11:
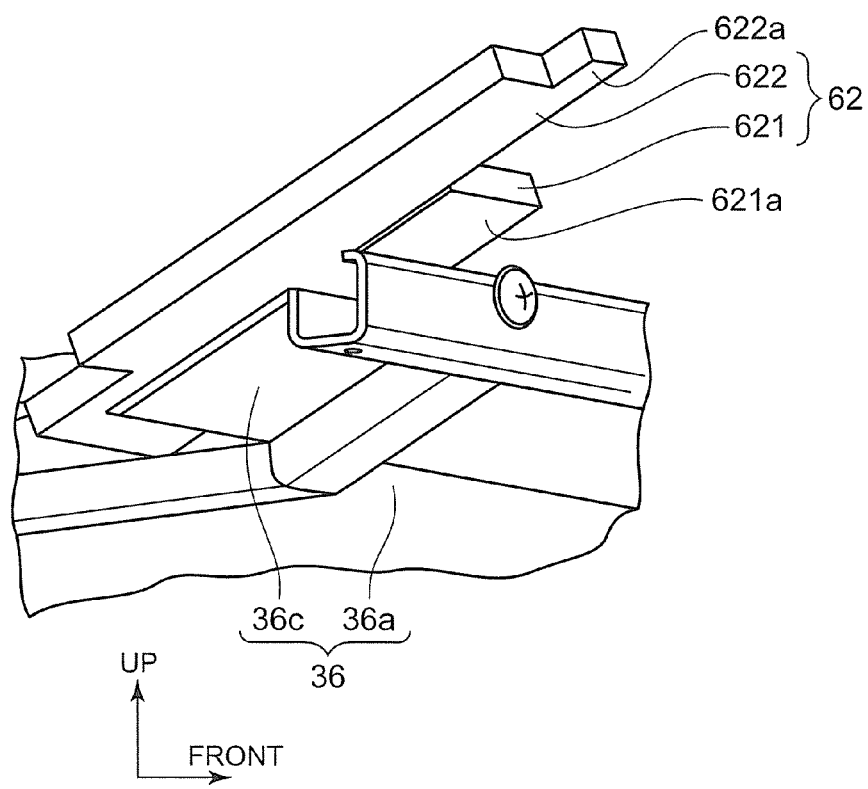
FIG. 11 is a perspective view viewed from diagonally right and below, of a state where an end of a sealing member of the storage box is developed.

FIG. 11 is a perspective view viewed from diagonally right and below, of a state where the end 62 of the sealing member 60 is developed.

As shown in FIG. 11, the end 62 is a plate member, and has a front portion 621 and a rear portion 622. The front portion 621 and the rear portion 622 each have a substantially rectangular parallelepiped shape. The front portion 621 has a lower surface 621a whereas the rear portion 622 has a lower surface 622a, and an adhesive agent is applied to the lower surfaces 621a and 622a.

Figure 12:
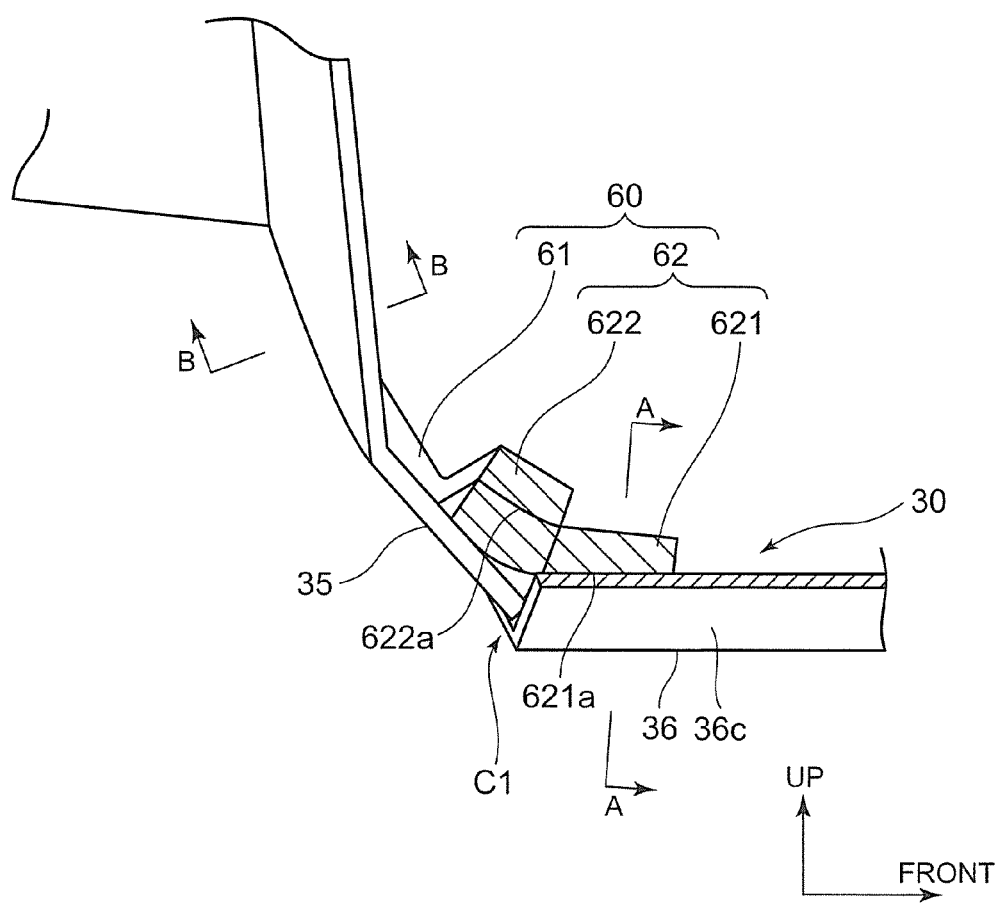
FIG. 12 is an explanatory partially sectional view of a sealing structure of the storage box.
Figure 13:
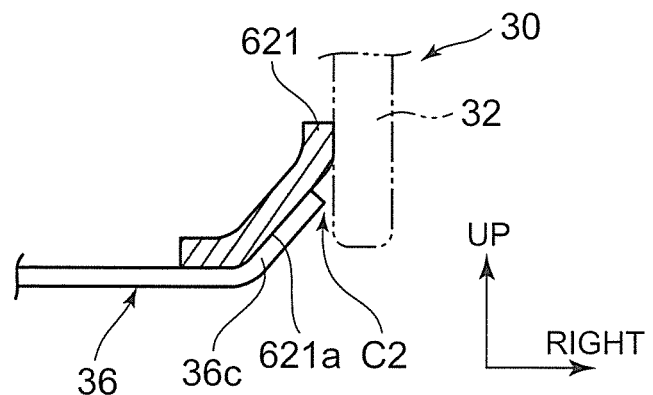
FIG. 13 is a sectional view taken along A-A indicated in FIG. 12.
Figure 14:
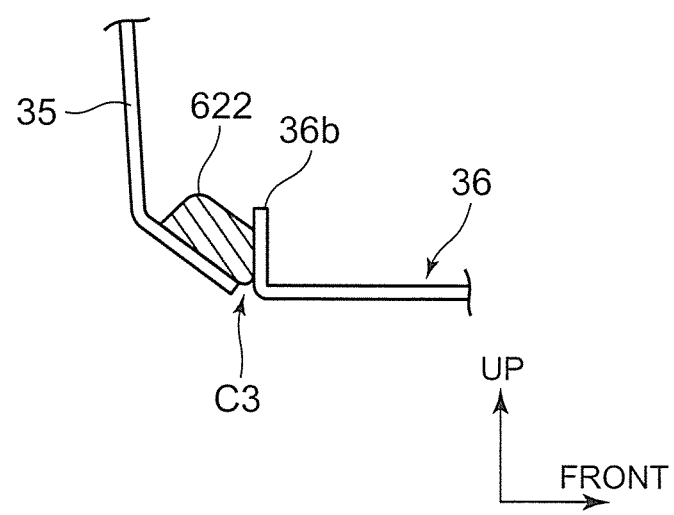
FIG. 14 is a sectional view taken along B-B indicated in FIG. 12.

FIG. 12 is an explanatory partially sectional view of a sealing structure of the storage box 30. FIG. 13 is a sectional view taken along A-A indicated in FIG. 12. FIG. 14 is a sectional view taken along B-B indicated in FIG. 12.

As shown in FIG. 12, the front portion 621 is bonded to the slant portion 36c of the bottom plate 36 by the lower surface 621a. The rear portion 622 is bent with the lower surface 622a being located inside, and the bent portions of the rear portion 622 are bonded to each other by the lower surface 622a. The end 62 seals a clearance C1 between the rear surface cover 35 and the bottom plate 36.

As shown in FIGS. 12 and 13, the front portion 621 is bonded to the slant portion 36c of the bottom plate 36 and the side surface cover 32 of the storage box 30 by the lower surface 621a. The front portion 621 seals a clearance C2 between the side surface cover 32 and the bottom plate 36.

As shown in FIGS. 12 and 14, the main body 61 is located between the rear surface cover 35 and the rising portion 36b of the bottom plate 36 and seals a clearance C3 between the rear surface cover 35 and the bottom plate 36.

[Effects of the Embodiment]

(1) The partition member 31 is detachably attached to the chassis 1 by the rivets 132. When at least part of the partition member 31 is detached from the chassis 1, the interior of the engine room 100 is easily accessible from the interior of the storage box 30. This configuration thus enables easy check or maintenance of the oil filter 112 or the like in the engine room 100 by way of the storage box 30. When the rivets 132 are located at arbitrary positions, arbitrary part of the partition member 31 can be detached from the chassis 1.

(2) The storage box 30 accommodates equipment including the air inlet 16A of the air import duct 16 of the air cleaner 21. The partition member 31 prevents entry of dust or the like of the engine 11 in the engine room 100 to keep the interior of the storage box 30 clean. This configuration thus reliably prevents entry of dust or the like to the air cleaner 21.

(3) The rivets 132 are located at the positions corresponding to the oil filter 112. The detached part of the partition member 31 from the chassis 1 can be thus minimized upon check or maintenance of the oil filter 112. This configuration thus enables efficient check or maintenance of the oil filter 112 in the engine room 100 by way of the storage box 30.

(4) The partition member 31 is made of elastic member. When the partition member 31 is detached from the chassis 1 and is turned over only in a necessary range, the interior of the engine room 100 is easily accessible.

(5) The partition member 31 and the fuel pipes 111 of the engine 11 are attached to the bracket 122. This configuration thus simplifies the structure for attaching the fuel pipes 111 as compared to a case of providing a bracket for attachment of the partition member 31 and a different bracket for attachment of the fuel pipes 111.

[Other Embodiments]

(1) The partition member 31 is attached to the longitudinal frames 101 and 102, the vertical frames 103 and 104, and the bracket 122 by the plurality of rivets 132 in the embodiment described above. The present invention is, however, not limited to this configuration. At least part of the partition member has only to be detachably attached to the chassis. For example, the remaining part of the partition member can be firmly fixed to the chassis or the like so as to be undetachable.

(2) The rivets 132 according to the above embodiment are configured as push rivets. The rivets 132 are not limited to this configuration but have only to detachably attach the partition member to the chassis. The rivets 132 can be bolts, nuts, hook and loop fasteners, or the like.

(3) The storage box 30 collectively accommodates the air inlet 16A of the air import duct 16 of the air cleaner 21 and the air inlet 25A of the cooling duct 25 of the V-belt continuously variable transmission 12 in the above embodiment. The present invention is, however, not limited to this configuration. For example, the storage box can accommodate only one of the air inlet of the air import duct of the air cleaner and the air inlet of the cooling duct of the V-belt continuously variable transmission, or can accommodate none of them.

(4) The partition member 31 is turned over to check or maintain the oil filter 112 in the above embodiment. However, the present invention does not limit a target of check or the like. The target can be a different engine accessory such as an oil cooler. The target is not limited to such an engine accessory but can be anything that is provided in the engine room and needs check or maintenance.

(5) The partition member 31 according to the above embodiment is made of rubber. The material for the partition member 31 is not limited to such rubber but can be elastic member such as soft high-molecular material, flame retardant fabric, a steel plate, or the like.

(6) The partition member 31 is provided with the cutout 31f extending in the front-back direction along the bracket 122 in the above embodiment. The present invention is, however, not limited to this configuration. For example, the partition member 31 can be provided with a cutout extending vertically or diagonally, or can be provided with no cutout.

(7) The seat 6 according to the above embodiment has one-row seat configuration. The utility vehicle can alternatively have two-row seat configuration, or three or more-rows seat configuration.

(8) The present invention is not limited to the configurations according to the embodiment described above, but can include various modification examples devisable within the range not departing from the features recited in the following patent claims.

What is claimed is:

1. A utility vehicle comprising:
    a chassis;
    an engine provided on the chassis;
    an engine room accommodating the engine;
    a storage box provided next to the engine room and accommodating equipment of the engine;
    a partition member dividing the engine room and the storage box;
    an attachment portion configured to detachably attach at least part of the partition member to the chassis; and
    a bracket attached to the chassis, wherein the partition member and a fuel pipe of the engine are attached to the bracket.

2. The utility vehicle according to claim 1, wherein the equipment includes an intake port of an air intake duct of an air cleaner.

3. The utility vehicle according to claim 1, wherein the engine has an engine accessory that requires check or maintenance, and the attachment portion is located at a position corresponding to the engine accessory.

4. The utility vehicle according to claim 1, wherein the partition member is made of elastic member.

* * * * *